H. P. FORTE.
TABLET STACKING MACHINE.
APPLICATION FILED AUG. 27, 1917.
1,291,821.
Patented Jan. 21, 1919.
3 SHEETS—SHEET 1.
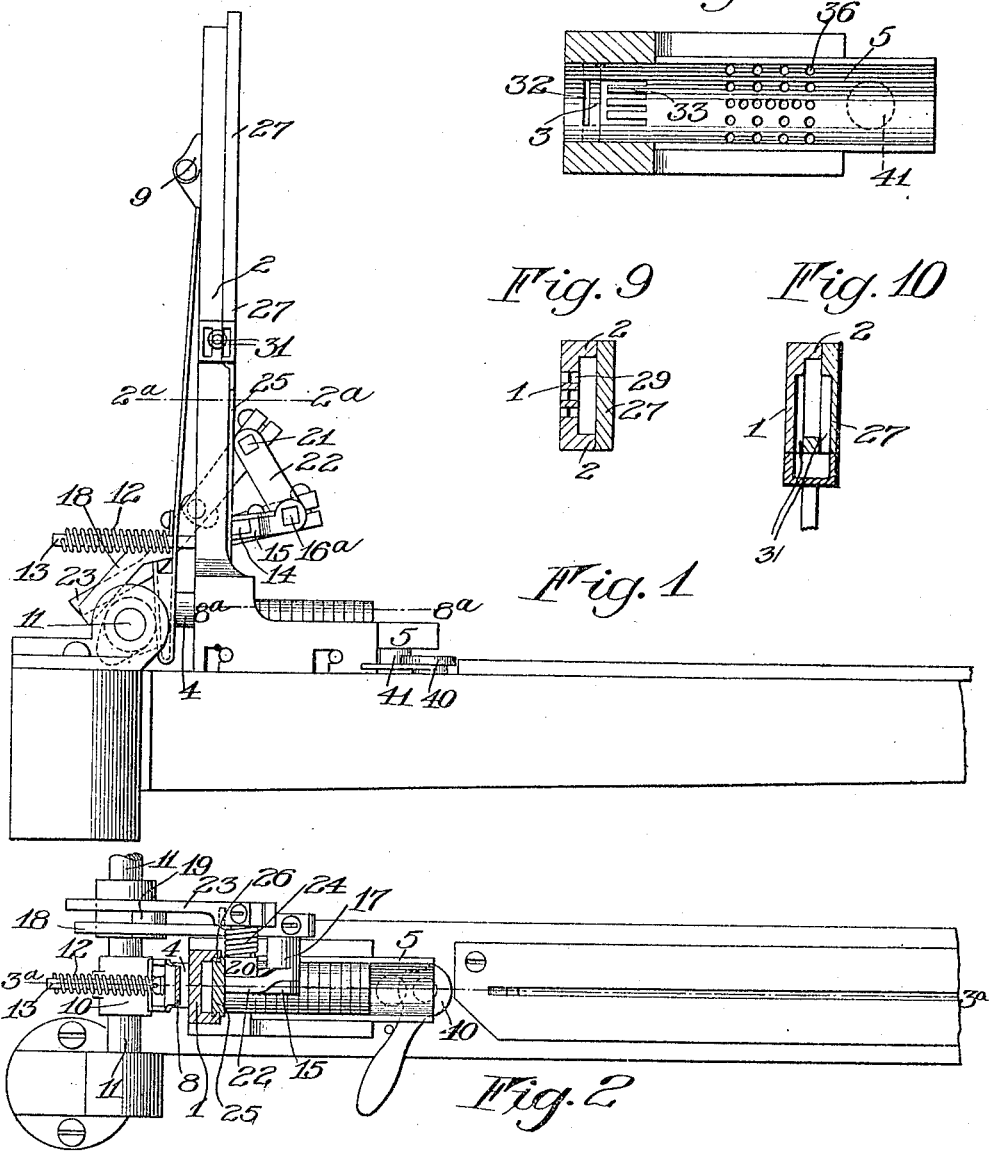
WITNESSES:
Walter B. Payne
George D. Powell
INVENTOR
Harry P. Forté
BY
his ATTORNEYS

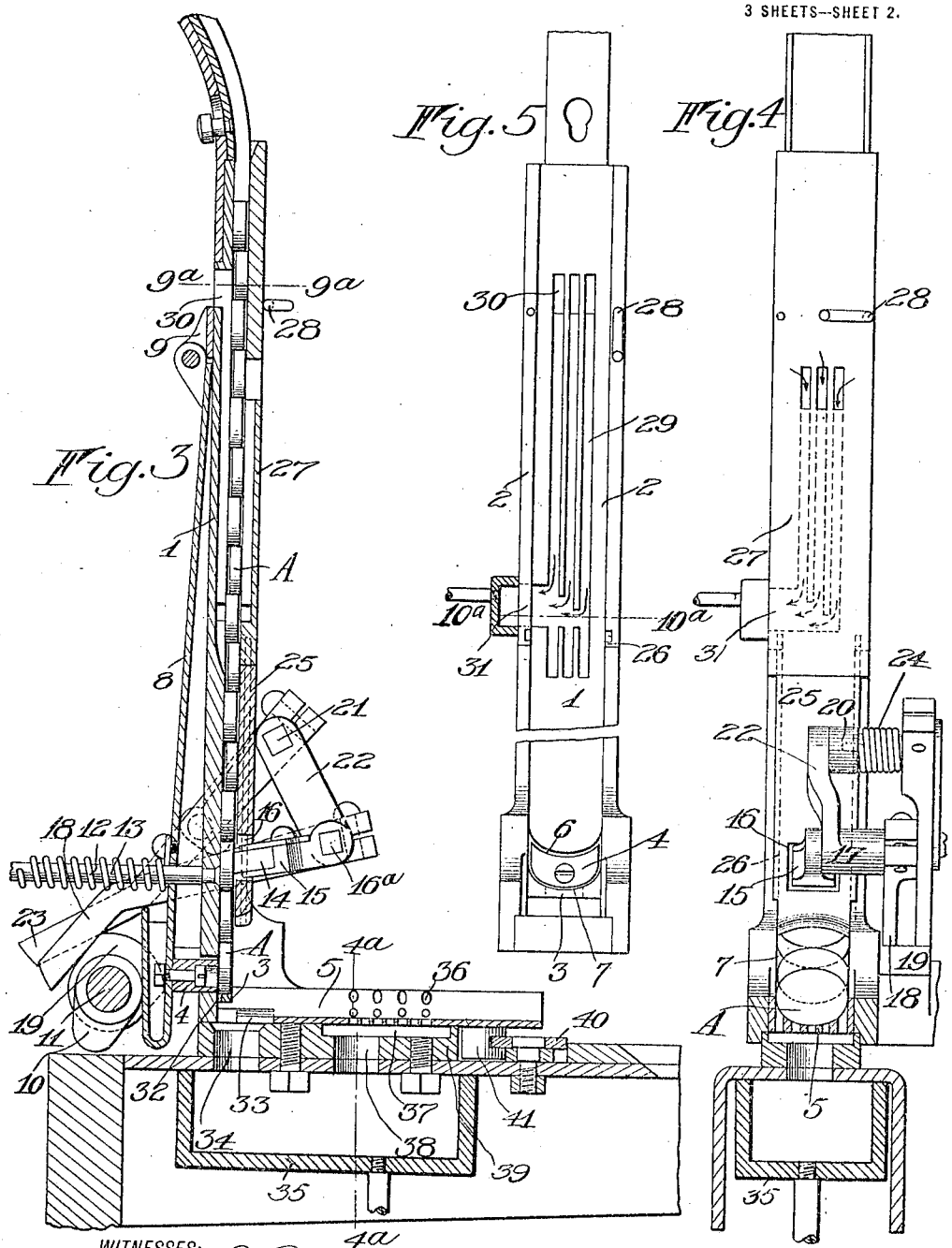

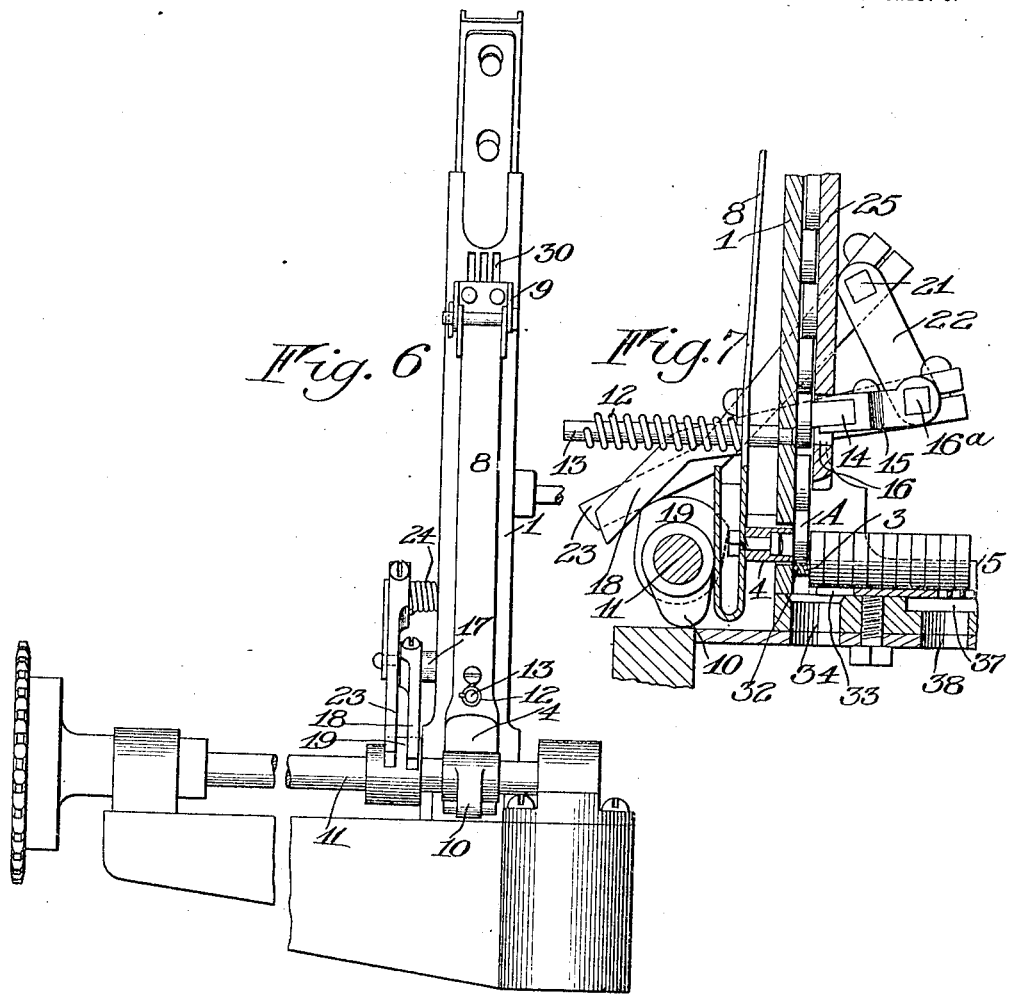

UNITED STATES PATENT OFFICE.

HARRY P. FORTÉ, OF CANAJOHARIE, NEW YORK, ASSIGNOR TO BEECH-NUT PACKING COMPANY, OF CANAJOHARIE, NEW YORK, A CORPORATION OF NEW YORK.

TABLET-STACKING MACHINE.

1,291,821.  Specification of Letters Patent.  Patented Jan. 21, 1919.

Application filed August 27, 1917. Serial No. 188,282.

*To all whom it may concern:*

Be it known that I, HARRY P. FORTÉ, of Canajoharie, in the county of Montgomery and State of New York, have invented certain new and useful Improvements in Tablet-Stacking Machines; and I do hereby declare the following to be a full, clear, and exact description of the same, reference being had to the accompanying drawings, forming a part of this specification, and to the reference-numerals marked thereon.

My invention relates to stacking machinery, and is intended particularly for use with small candy tablets, and similar articles, which are sold to the trade in the form of packages containing about a dozen. One of the purposes of the invention is to enable collecting and stacking the tablets quickly and uniformly, and to provide an arrangement in which the tablets will feed regularly, without choking the machinery. A further purpose is to make provision for tablets having sharp corners at their edges, whereby they will be free from jarring, or other action, that will tend to chip or break the edges. An additional object of the improvement is to thoroughly clean the tablets while passing through the machine by removing any surplus dust or powder from their surfaces. To these and other ends the invention consists in certain improvements and combinations of parts all as will be hereinafter more fully described, the novel features being pointed out in the claims at the end of the specification.

In the drawings:

Figure 1 is a side elevation of an apparatus constructed in accordance with the invention;

Fig. 2 is a horizontal sectional view on the line 2ª—2ª of Fig. 1;

Fig. 3 is a vertical sectional view on the line 3ª—3ª of Fig. 2;

Fig. 4 is a transverse vertical sectional view on the line 4ª—4ª of Fig. 3, with the front portion of the conducting chute removed;

Fig. 5 is a front elevation of the conducting chute and ejector, with the column lifting device and front portion of the chute removed;

Fig. 6 is a rear elevation;

Fig. 7 is an enlarged sectional view taken in the same plane as Fig. 3, and showing the position of the column lifting device after it has elevated the column from the position shown in Fig. 3;

Fig. 8 is a horizontal sectional view on the line 8ª—8ª of Fig. 1;

Fig. 9 is a horizontal sectional view on the line 9ª—9ª of Fig. 3, and

Fig. 10 is a horizontal sectional view on line 10ª—10ª of Fig. 5.

Similar reference characters throughout the several figures indicate the same parts.

In the structure disclosed, there is a conducting chute comprising a channel body portion consisting of a back wall 1 and side walls 2. There are suitable front walls that will be referred to more particularly hereinafter, and together with the previously mentioned channel portion form a passage for the tablets. The latter, in the case of candy, for which the apparatus is more especially designed, may be fed from a suitable hopper, or from a tablet forming apparatus with which the present machine may conveniently be used. The tablets travel down the conducting chute, one upon the other in vertical position, resting at the bottom upon a retaining ledge 3. The chute is cut away for a sufficient height in front of the retaining ledge 3 to admit a single tablet as it is forced from the retaining ledge by the ejector 4. When the lowermost tablet is forced from the retaining ledge 3 by the ejector, it falls in a vertical position onto the upper surface 5 of the receiving channel. The present machine is constructed with a view to handling oblong tablets, as illustrated in Fig. 4 by A, and the receiving channel 5 is curved so as to accommodate the curved edge of the tablet with its long axis extending laterally.

The retaining ledge 3 is curved to conform to the shape of the tablet, and the upper and lower edges of the ejector 4 are also correspondingly curved, as indicated at 6 and 7. Thus the ejector conforms to the shape of the retaining ledge 3, while its upper surface is properly shaped to receive the lower edge of the next succeeding tablet immediately after the lowermost one is ejected from the ledge 3, and while the ejector is returning to its initial position. The ejector 4 is secured upon an elongated arm 8, which is pivoted at its upper end between lugs 9, attached at the back of the chute. The ejector is actuated by a cam 10 fixed on the continuously rotating cam shaft 11, and it is returned to its initial position by a spring 12, which surrounds a stationary rod 13. The rod 13 passes through an opening in the arm 8, and the spring 12 has its opposite ends connected to the outer end of the rod 13 and to the arm 8, acting by tension to draw the latter normally rearwardly to the position shown in Fig. 3. The ejector is moved forwardly to discharge a tablet by the positive action of the cam 10.

The receiving channel 5 is located below the retaining ledge 3 a considerable distance with reference to the width of a tablet, and this distance between the retaining ledge and the receiving channel is such that when a tablet is supported in the receiving channel, less than half of its periphery extends above the retaining ledge. This arrangement is such as to effectually prevent a tablet located in the receiving channel from projecting, or falling backwardly toward the chute, even to a slight degree, so as to impede the progress of the succeeding tablets.

It is quite essential to a machine of this class that candy tablets be handled in such a manner that their edges will not be broken, or chipped, and I have made specific provision for obviating any such result that might occur from the ejecting operation. It has been found that even with small tablets, the pressure of a column resting upon a tablet that is being ejected from the bottom of the column, will cause the edges to chip slightly. To remedy this, I have arranged a device which automatically engages and elevates the column, thus relieving the pressure from the tablets at the bottom, as the ejecting operation takes place.

The engaging device is in the form of a slightly yieldable or resilient pad 14, arranged in a cup 15 and movable through an opening 16 in the front wall of the chute. The column lifting device is so controlled by automatic mechanism that it moves initially inwardly of the tube until it engages a tablet of the column, and then moves slightly in an upward direction, elevating the column as shown in Fig. 7. This operation takes place in the following manner.

The cup 15 is mounted on an arm fixed on rock shaft 16ª, which is journaled in a bearing 17 of a support to be described presently. The rock shaft 16ª carries at its opposite end a cam actuated lever 18, which is controlled by a cam 19 on the cam shaft 11. Thus when the outer end of the lever 18 is elevated by the cam 19, it causes a corresponding elevation of the lifting device, which has previously been brought into engagement with a tablet of the column.

To this end, the support in which the lifting device is held is pivotally arranged in a bearing 20 on the front wall of the chute. The said support comprises an arbor 21 and an arm 22, which carries the aforementioned bearing 17. The arbor 21 is provided at its outer end with the cam actuated lever 23, and is also controlled by the cam 19. A spring 24 serves to retain the support just described in its normal, or outer position, disengaged from the tablet column. The cam levers 18 and 23 are so formed that as the cam 19 rotates it causes first an upward movement of the lever 23, rocking the pivoted support, and thereby moving the lifting device inwardly toward the column. Instantly after this takes place the lever 18 is elevated, thereby moving the lifting device and with it the column of tablets in an upward direction at least far enough to remove the weight from the tablet at the bottom. The cams 10 and 19 are so positioned with relation to each other that the column lifting operation just described takes place immediately before the ejector commences its forward movement, and the column is held in such elevated position until the lowermost tablet has been entirely ejected from the retaining ledge 3. Thereafter the column is released and the tablets drop downwardly ready for a second operation. While the tablets are of oblong contour, they can be fed to the machine without regard to their position, as the continual slight jogging they receive each time the column is elevated and released is just enough to cause the tablets to right themselves until they assume their final position with the major axis extending horizontally.

The lifting device just described is preferably arranged upon a removable panel 25, which is slidably disposed at the front of the conducting chute and engages guideways 26 provided for the purpose. Above the panel 25 there may also be a supplemental movable panel 27, overlying the edges of the side walls of the channel portion of the chute and held in place by a pivoted locking lever 28. These panels form the front wall of the chute.

It is desirable that the candy tablets be cleaned by removing the surplus dust and powder, and to accomplish this I subject them to a current of air, preferably by suction, at different points. The chute walls are provided with a series of grooves 29, preferably arranged in both the front and back wall, and communicating at the upper end with an opening 30, and at the lower end with an opening 31. One of these openings may lead to the atmosphere, while the other may be connected with a suitable source of air suction, or pressure. The retaining ledge 3, at the bottom of the chute, has a small opening 32, and the receiving channel 5 has openings 33, located at the point where a tablet initially falls onto the channel, and these several openings communicate through a port 34 with a chamber 35, which is connected with the pressure, or vacuum source, already referred to. The receiving channel 5 is provided with openings 36, which communicate through the cut-away portion 37 and the port 38 with the chamber 35, already mentioned. By this means the tablet is subjected to a current of air as it travels down the chute, also as it reaches the bottom, again as it is ejected from the retaining ledge into the receiving channel, and finally during its travel along the receiving channel. This action clears the surfaces of the tablets from any adhering dust, or powder particles.

The channel 5 is preferably removable, being supported in the base portion 39, and held in place by a rotary clamp 40, which engages a locking recess in a projecting lug 41 carried by the channel. The inner end of the channel engages under and is held by portions of the chute wall.

I claim as my invention:

1. In a tablet stacking apparatus, the combination with a conducting chute terminating at its bottom in a retaining ledge and cutaway at its front for a sufficient distance above said ledge to admit a tablet, of an ejector movable across said retaining ledge, and a receiving channel located adjacent to the retaining ledge and beneath the same a sufficient distance relatively to the size of the tablet so that a tablet located in the receiving channel cannot extend into the chute.

2. In a tablet stacking apparatus, the combination with a conducting chute terminating at its bottom in a retaining ledge and cutaway at its front for a sufficient distance above said ledge to admit a tablet, an ejector movable across said retaining ledge, and a receiving channel located adjacent to the retaining ledge with its upper surface arranged beneath the upper surface of the ledge a considerable distance relatively to the width of a tablet so that a tablet located in the receiving channel cannot project into the chute.

3. In a stacking apparatus for tablets having curved peripheries, the combination of a conducting chute, a retaining ledge at the bottom of the chute curved to correspond to the periphery of the tablet, an ejector movable across the ledge having its lower edge curved to correspond to the curvature of the lower periphery of the tablet with which it engages and its upper edge curved to correspond to the curvature of the lower edge of an overlying tablet, and a receiving channel having a correspondingly curved surface.

4. In a stacking apparatus for tablets having curved peripheries, the combination of a conducting chute, a retaining ledge at the bottom of the chute curved to correspond to the periphery of the tablet, an ejector movable across the ledge having its lower edge curved to correspond to the curvature of the lower periphery of the tablet with which it engages and its upper edge curved to correspond to the curvature of the lower edge of an overlying tablet, and a receiving channel having a correspondingly curved surface and located beneath the retaining ledge a distance relatively to the width of a tablet sufficient to prevent a tablet in the channel from projecting into the chute.

5. A conducting chute for tablet stacking apparatus having openings in opposite walls and conducting passages extending longitudinally of said walls adjacent to the tablets so as to permit creating a current of air through the chute for cleaning the tablets.

6. In a tablet stacking apparatus, the combination with a conducting chute, of a retaining ledge at its bottom having an opening therein to permit passage of air for cleaning the tablets, and an ejector movable over said ledge.

7. In a tablet stacking apparatus, the combination with a conducting chute, of a retaining ledge at its bottom, an ejector movable across said ledge, and a receiving channel located adjacent to and beneath the ledge and provided with openings to permit passage of air for cleaning the tablets.

8. In a tablet stacking apparatus, the combination with a conducting chute, of a retaining ledge at its bottom, an ejector movable across said ledge, and a receiving channel located adjacent to and beneath the ledge and provided with openings at the point where a tablet initially strikes in falling from the chute to permit passage of air for cleaning the tablets.

9. In a tablet stacking machine, the combination with a conducting chute, of a retaining ledge at the bottom of the chute, an ejector movable across said ledge, and a column lifting device acting automatically to lift the column of tablets above the lowermost one previous to the operation of the ejector in order to relieve the lowermost tablet from pressure of the column above.

10. In a tablet stacking machine, the combination with a conducting chute, of a retaining ledge at the bottom of the chute, an ejector movable across said ledge, and a column lifting device which operates previous to the actuation of the ejector, and moves initially inwardly of the chute to engage one of the tablets and thence upwardly to lift the column of tablets.

11. In a tablet stacking machine, the combination with a conducting chute, of a retaining ledge at the bottom of the chute, an ejector movable across said ledge, and a column lifting device which extends through an opening in the chute and is automatically moved against a tablet and thence upwardly 12. In a tablet stacking machine, the combination with a conducting chute, of a retaining ledge at the bottom of the chute, an ejector movable across said ledge, a column lifting device extending through a wall of the chute to engage a tablet of the column, and operating means comprising a pivoted support, a cam actuated lever on the support, an arm pivoted on the support and carrying the column lifting device, a second cam actuated lever arranged on said arm, and a rotary cam coöperating with said levers.

13. In a tablet stacking machine, the combination with a conducting chute, of a retaining ledge at the bottom of the chute, an ejector movable across said ledge, a column lifting device extending through the chute to engage a tablet of the column, and operating means comprising a support pivoted at its upper end and movable inwardly, a cam actuated lever on the support, an arm pivoted at its outer end on the support and movable upwardly at its inner end on which the column lifting device is mounted, a second cam actuated lever arranged on said arm, and a rotary cam coöperating with said levers.

14. In a tablet stacking machine, the combination with a conducting chute, of a retaining ledge at the bottom of the chute, an ejector movable across said ledge, a removable panel forming one wall of the chute, and an automatically operated column lifting device carried by said panel.

15. In a tablet stacking machine, the combination with a conducting chute, of a retaining ledge at the bottom of the chute, an ejector movable across said ledge, a removable panel forming one wall of the chute, an automatically operated column lifting device carried on said panel, comprising cam operated means for controlling the column lifting device including a pivoted support, a cam actuated lever carried thereby, an arm pivoted on the support and carrying the column lifting device, a second cam actuated lever arranged on said arm, and a rotary cam coöperating with said levers.

16. In a tablet stacking machine, the combination of a conducting chute, a retaining ledge at the bottom of the chute, an ejector movable across said ledge, a column lifting device carried on said chute and adapted to lift the column of tablets in the chute while an underlying tablet is being ejected, a rotatable shaft having a cam for actuating the ejector, and means on said shaft for actuating the column lifting device.

17. In a tablet stacking machine, the combination of a conducting chute, a retaining ledge at the bottom of the chute, an ejector movable across said ledge, a column lifting device carried on said chute and adapted to lift the column of tablets in the chute while an underlying tablet is being ejected, a rotatable shaft having a cam for actuating the ejector, and a second cam on said shaft adapted to coöperate with a pair of arms for actuating the column lifting device.

18. In a tablet stacking machine, the combination of a conducting chute, a retaining ledge at the bottom of the chute, an arm pivoted to the chute, an ejector carried by said arm and movable over said ledge to remove a tablet from the bottom of the chute, a cam for actuating the lever to eject the tablet, and a spring for returning the lever and retracting the ejector.

HARRY P. FORTÉ.